Patented Sept. 6, 1932

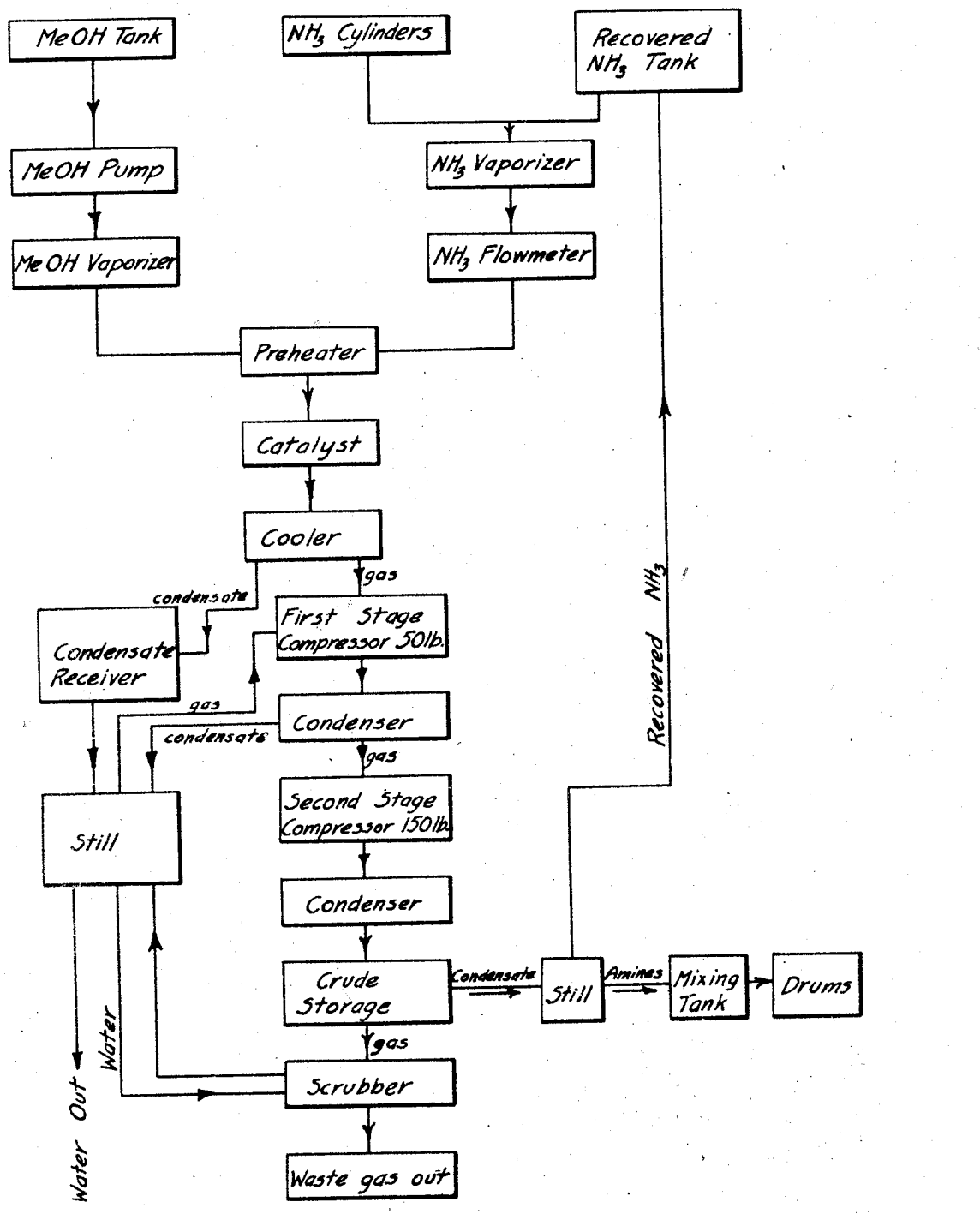

1,875,774

UNITED STATES PATENT OFFICE

LLOYD C. SWALLEN AND BENJAMIN C. BOECKELER, OF TERRE HAUTE, INDIANA, ASSIGNORS TO COMMERCIAL SOLVENTS CORPORATION, OF TERRE HAUTE, INDIANA, A CORPORATION OF MARYLAND

RECOVERY OF METHYL AMINE

Application filed August 21, 1930. Serial No. 476,794.

This invention relates to a method for the recovery of methyl amine from mixtures containing ammonia. More specifically, this invention relates to a process for the recovery of methyl amine from the mixtures obtained in the catalytic synthesis from methanol and ammonia.

Methyl amine may be prepared from formaldehyde and ammonium chloride, from methyl cyanate, by the reduction of hydrocyanic acid, by the action of ammonia on methyl iodide, methyl chloride, methyl nitrate, etc. However, it may best be made upon a commercial scale by catalytic synthesis from methanol and ammonia, as disclosed in co-pending applications Serial Nos. 468,992 and 468,993, filed July 18, 1930, by Lloyd C. Swallen and Jerome Martin. In this method, methanol vapor and ammonia are passed over metallic oxide dehydrating catalysts or over aluminium silicate at temperatures of from 300° to 500° C. The mixture leaving the catalyst is found to comprise methyl amine (a mixture of mono-, di- and tri-methyl amines), ammonia, any unconverted methanol, the water which is formed in the reaction, and any decomposition products of the methanol or ammonia, such as hydrogen and carbon monoxide.

The recovery of methyl amine from such ammonia-containing mixtures has presented a problem which has not been satisfactorily solved until the present time. Expensive and complicated methods involving the formation of the salts and fractional crystallization or selective solution have been employed. These methods, however, are obviously disadvantageous from the standpoint of commercial production.

The present invention comprises a satisfactory and economical method for the separation of methyl amine from ammonia. By "methyl amine" is meant the mono-, di-, tri-, or any mixture of these. However, the monomethyl amine is of primary importance at the present time from a commercial standpoint, and the present method is devised to recover a mixture containing substantially all of the mono-compound. It has been found that the physical properties of ammonia differ sufficiently from those of methyl amine to make possible their virtually complete separation by fractional distillation.

Although the present process is especially applicable to the mixtures resulting from the catalytic synthesis from methanol and ammonia, it is to be distinctly understood that the invention is not to be limited to the use of such mixtures. The process may be adapted to any mixtures of methyl amine and ammonia. For example, if methyl amine is produced by the reaction of methyl chloride and ammonia, the bases will be present as the hydrochloric acid salts; these, however, may be freed by treatment with a non-volatile base, and the resulting mixture, which contains methyl amine and ammonia, treated by the method of the present invention.

This invention consists essentially in liquefying the mixture of methyl amine and ammonia, and separating them by fractional distillation. The method for carrying out the process may best be seen from the accompanying flow sheet. It is seen that the mixture leaving the catalyst is first cooled in order to remove the unconverted methanol, the water formed in the reaction, and any condensation products or other products of side reactions which may be removed at this point by condensation. The uncondensed gases are then compressed in the first stage of a two-stage compressor, to a pressure of about 50 lbs. and then cooled again to remove the remainder of the substances which will condense at temperatures above the condensation point of methyl amine or ammonia at that pressure. The mixture then goes to the second stage of the compressor where it is compressed to about 150 lbs., and is then cooled at that pressure to condense the ammonia and methyl amine. The mixture then goes to a crude storage tank where the non-condensable gases are bled off. These gases consist of hydrogen, carbon monoxide, nitrogen, and other decomposition products of the materials entering the catalyst chamber. The liquid amines and ammonia are fed directly from the crude storage tank into approximately the middle of the column of a pressure still. The recovered ammonia, which comes off at the top of the column is condensed and sent to storage tanks, to be used in the catalysis. The amines reflux in the column and are collected in the kettle, from which they may be removed continuously or semi-continuously and sent to mixing tanks where they are diluted to the desired concentration for storage, shipping, etc. As may be seen from the flow sheet, the condensates containing water, methanol, etc., are collected and distilled to recover any amines or ammonia, and then fractionated to recover any methanol, etc. The water from this distillation is used to scrub the non-condensable gases and is then returned to the still.

The distillation is carried out at approximately 150 lbs. and sufficient heat is supplied to the kettle to give a good reflux in the column and a steady distillation of the ammonia without mechanically carrying over the amine. The following example will best serve to illustrate the method of carrying out the distillation. The liquefied ammonia and amine, obtained from the catalytic product as described above, are fed into a thirty-plate bubble-cap column just above the fourteenth plate. The still comprises a steam-jacketed pressure kettle, and the condenser is a horizontal double-pipe cooler fitted with a by-pass back to the top of the column. Heat is supplied to the kettle and the liquefied gases are introduced into the column at a pressure of approximately 150 lbs. In normal operation, a portion of the condensate is run to the recovered ammonia storage tank, and the remainder is by-passed back to the top of the column to give a reflux ratio of about 5:1. When operating under these conditions the distillate is found to consist of about 95% ammonia, 0.5% mono-methyl amine, and 4.5% of higher amines, mainly tri-methyl. By this method of operation the ammonia content of the mixture of amines remaining in the kettle may be reduced to less than 2 mol % of the total amines.

It is to be understood, of course, that this invention is not to be limited to the use of the particular equipment described above, nor to the particular operating conditions. For example, a packed column might be used in place of the bubble-cap plate type, and a dephlegmator might be employed in series with the condenser instead of by-passing a part of the total condensate back to the column. While 150 lbs. is the preferred pressure at which the operation is to be carried out, the pressure may be varied widely without departing from the spirit of the invention. It has been found that a range of 125 to 200 lbs. is satisfactory, but even these values are not limiting. The lower limit of pressure will depend upon the available cooling means for the condensers; the higher limit upon the cost of equipment, and the maintenance cost for a high pressure operation. It has been found that 150 lbs. is a satisfactory pressure from both points of view, since an ordinarily available water supply will serve for cooling, and the pressure is not sufficiently high to necessitate very expensive equipment. If desired, the process may be operated by the batch method instead of continuously or semi-continuously.

The invention now having been described, what is claimed is:

1. A process for recovering methyl amine from mixtures containing ammonia, which comprises liquefying the methyl amine and ammonia and fractionally distilling under pressure to separate the ammonia from the methyl amine.

2. A process for recovering methyl amine from mixtures containing ammonia, which comprises liquefying the methyl amine and ammonia and fractionally distilling under pressure of from 125 to 200 lbs. to separate the ammonia from the methyl amine.

3. A process for recovering methyl amine from mixtures containing ammonia, which comprises liquefying the methyl amine and ammonia and fractionally distilling under a pressure of about 150 lbs. to separate the ammonia from the methyl amine.

4. A process for recovering methyl amine from mixtures containing ammonia, which comprises removing by condensation the products which are liquid at atmospheric temperatures and pressures, liquefying the methyl amine and ammonia, bleeding off the non-condensable gases, and fractionally distilling under pressure to separate the ammonia from the methyl amine.

5. A process for recovering methyl amine from mixtures containing ammonia, which comprises removing by condensation the products which are liquid at atmospheric temperatures and pressures, liquefying the methyl amine and ammonia, bleeding off the non-condensable gases, and fractionally distilling under pressures of from 125 to 200 lbs. to separate the ammonia from the methyl amine.

6. A process for recovering methyl amine from mixtures containing ammonia which comprises removing by condensation the products which are liquid at atmospheric temperatures and pressures, liquefying the methyl amine and ammonia, bleeding off the non-condensable gases, and fractionally distilling under a pressure of about 150 lbs. to separate the ammonia from the methyl amine.

7. A process for recovering methyl amine from mixtures obtained in the catalytic synthesis of methyl amine from methanol and ammonia, which comprises liquefying the methyl amine and ammonia and fractionally distilling under pressure to separate the ammonia from the methyl amine.

8. A process for recovering methyl amine from mixtures obtained in the catalytic synthesis of methyl amine from methanol and ammonia, which comprises liquefying the methyl amine and ammonia and fractionally distilling under pressures of from 125 to 200 lbs. to separate the ammonia from the methyl amine.

9. A process for recovering methyl amine from mixtures obtained in the catalytic synthesis of methyl amine from methanol and ammonia, which comprises liquefying the methyl amine and ammonia and fractionally distilling under a pressure of about 150 lbs.

10. A process for recovering methyl amine from mixtures obtained in the catalytic synthesis of methyl amine from methanol and ammonia, which comprises removing by condensation the products which are liquid at atmospheric temperatures and pressures, liquefying the methyl amine and ammonia, bleeding off the non-condensable gases, and fractionally distilling under pressure to separate the ammonia from the methyl amine.

11. A process for recovering methyl amine from mixtures obtained in the catalytic synthesis of methyl amine from methanol and ammonia, which comprises removing by condensation the products which are liquid at atmospheric temperatures and pressures, liquefying the methyl amine and ammonia, bleeding off the non-condensable gases, and fractionally distilling under pressures of from 125 to 200 lbs. to separate the ammonia from the methyl amine.

12. A process for recovering methyl amine from mixtures obtained in the catalytic synthesis of methyl amine from methanol and ammonia which comprises removing by condensation the products which are liquid at atmospheric temperatures and pressures, liquefying the methyl amine and ammonia, bleeding off the non-condensable gases, and fractionally distilling under a pressure of about 150 lbs.

In testimony whereof we affix our signatures.

LLOYD C. SWALLEN.
B. CLARK BOECKELER.